Figure 1:
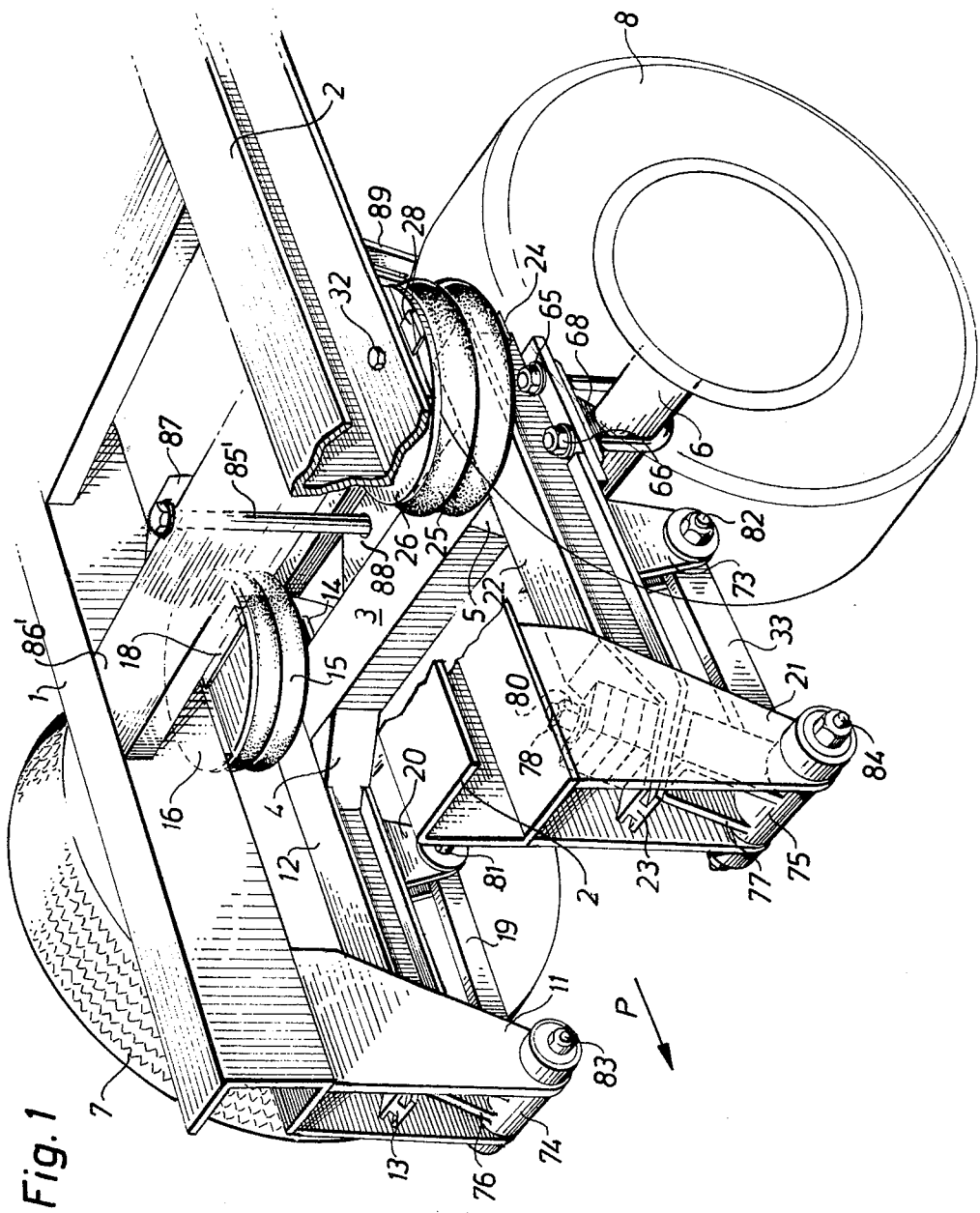

United States Patent [19]

Rickardsson

[11] 3,964,764

[45] June 22, 1976

[54] AIR SPRING AXLE ASSEMBLY FOR SPRING SUSPENSION AND SWAY RESTRAINING OF VEHICLE CHASSIS

[76] Inventor: Erik Georg Rickardsson, Industrigatan 14, 732 00 Arboga, Sweden

[22] Filed: Dec. 26, 1974

[21] Appl. No.: 536,442

[30] Foreign Application Priority Data

Jan. 11, 1974 Sweden .............................. 7400362

[52] U.S. Cl. .............................................. 280/702
[51] Int. Cl.² ........................................ B60G 11/62
[58] Field of Search .................... 280/124 F, 124 B; 267/113, 122

[56] References Cited
UNITED STATES PATENTS

2,941,817  6/1960  Benson ............................ 280/124 F

FOREIGN PATENTS OR APPLICATIONS

1,207,540  2/1960  France ............................. 280/124 F
1,152,024  7/1963  Germany ......................... 280/124 B
  471,697  6/1969  Switzerland .................... 280/124 F

*Primary Examiner*—Robert J. Spar
*Assistant Examiner*—Randolph A. Reese

[57] ABSTRACT

An air spring axle assembly for spring suspension and sway restraining of vehicle chassis, including a U-shaped frame spring-mounted in relation to the chassis and supporting a stiff wheel axle. The U-shaped frame is torsion-proof and constructed as a box girder, the air springs of the assembly resting in the vicinity of the web of the girder, the wheel axle unit with the wheels being tightly fixed to said frame as a unit, and the U-girder being also mounted in the chassis in chassis shackles by means of a draw link mounted for each leg in the U-girder. The opposite or free end of the link is linked to the corresponding leg of the U-girder at a point between the chassis shackles and the web and the ends of the legs remote from the web are inserted in the chassis shackles and held in the latter by sway controlling units combined with the mounting bushings of the shackles and enabling a swinging movement, guided laterally through the mountings, of the wheel axle in a vertical direction.

6 Claims, 3 Drawing Figures

AIR SPRING AXLE ASSEMBLY FOR SPRING SUSPENSION AND SWAY RESTRAINING OF VEHICLE CHASSIS

The invention refers to an air spring axle assembly for spring suspension and sway restraining of vehicle chassis, especially for load having a high center of gravity, with simultaneous good track steering of the wheels of the vehicle.

As is well-known, motor vehicles and vehicles drawn thereby are subjected to very heavy strains through impacts and vibrations caused by bumps in the roadway, especially in the case of vehicles for load having a high center of gravity. With a bulky load and/or a heavy load, the strains on the vehicle materials and also on the goods transported are very great, inter alia due to the fact that the spring suspension system of the vehicle has to be suited both to loaded and to unloaded vehicle, at the same time as in the former case a balancing of a possible uneven load distribution on the vehicle is sought — requirements that in the case of prior devices could not be simultaneously fulfilled in a satisfactory manner.

For the spring suspension of vehicle chassis there have relatively early been developed air spring suspension systems in which bellows-shaped air spring suspension elements take up the vertical load from the vehicle chassis and load. The air springs in such systems then communicate with a pneumatic air control system by means of which one may, on the one hand, control the pressure in the air springs in response to the load and, on the other hand, may realize a compensation of the pressure in the various air springs in response to non-uniformities of the load distribution. To some extent it has also been attempted to utilize the pneumatic control system for a certain sway restraining effect. However, air springs are rather unstable in the lastmentioned respect, and in prior spring systems the air spring suspension means have always been supplemented by mechanical sway restrictors.

In one type of air spring axle assembly the air spring suspension has, inter alia, been arranged such that draw bars have been mounted by means of torsional mounting in shackles which have been provided in the two longitudinal beams of the chassis, the opposite or rear end of each draw bar being connected with the corresponding chassis beam through an air spring and axle brackets for the wheels being disposed between the shackles and the air spring suspension units on the draw bars. The connection between the wheel axle and the axle brackets were then also intended to take place through torsion-proof rubber bushings. Between the draw bar ends connected with the air springs there was also provided a transverse bar which was connected with the draw bar ends through torsion rubber bushings. Between said bar and a transverse beam in the chassis there were also provided shock absorbers in the conventional manner.

In another prior device the arrangement just described has been modified by making the draw bar articulated between the mounting in the chassis shackle and the air spring suspension support and replacing the transverse bar by the wheel axle of the vehicle, a spring element being introduced between the axle bracket and the portion of the draw bar situated next to the chassis shackle in such a manner that the spring tended to keep the articulated draw bar straight.

In a further prior device the arrangement first described has been modified by constructing the draw bar in the shape of a single or double leaf spring.

All of the prior devices here described suffer from serious deficiences. A common drawback in the case of these devices is that the sway restraining function is based exclusively on torsion in a number of mounting bushings. This results in an uncontrollable sway restraining effect which is besides subjected to ageing phenomena and wear.

Another drawback is the many joints which may easily result in fractures. Especially the device having an articulated draw bar is particularly delicate in the respect in question.

The device having a spring-mounted draw bar has in practice been found to be very susceptible to fractures in the leaf springs forming the draw arm.

Finally, in the case of the prior devices the mounting and fixing of the wheel axles on the draw bars is extremely difficult, due to the fact that in prior devices for stability reasons one has been reduced to arranging the wheel axle substantially at a level with the air springs which results in very compact constructions.

It has also been suggested to suspend a stiff wheel axle in a chassis by means of an elastically deformable U-shaped frame, the two leg ends of which are mounted in the chassis, while the web portion, through air or helical springs, transfers the remaining portion of the wheel presssure to the chassis. Then the stiff wheel axle is rigidly fixed to one leg of the frame and yieldingly fixed to the other leg to permit the elastic movements of the frame without fractures on the wheel axle of its brackets.

However, this construction does not either yield the solution protected by the present publication of providing precise controllable and adjustable sway restraining of the vehicle.

Thus, the present invention essentially consists in the fact that the U-shaped frame is torsion-proof and suitably steel-cast and preferably constructed as a box girder, the air spring or springs of the assembly resting on the web of the girder or in the vicinity thereof and the wheel axle unit with the wheels being intended to be tightly fixed to said frame as a unit, for example by screwing, the U-girder being also mounted in the chassis in chassis shackles or the like by means of a draw link mounted for each leg in the U-girder, the opposite or free end of said link being linked to the corresponding leg of the U-girder at a point between said chassis shackles and the web of the U-girder and the ends of the legs remote from the web being inserted in the chassis shackles and being held in the latter by sway controlling units combined with the mounting bushings of the shackles and enabling a swinging movement, guided laterally through the mountings, of the wheel axle in a vertical direction.

According to an embodiment of the invention the linking of the rear ends of the draw links is made within girder shackles mounted on the legs of the U-girder in such a way that the draw links will be directed upwards substantially in parallel with the legs of the U-girder. The said legs then have their ends suitably bent upwards towards the chassis, so that their direction substantially coincides with a connecting line between the rear mounting of the draw links and a fixed engagement position of each leg end against a rest position in the corresponding sway controlling unit.

The spring pressure of the leg spring bushings is preferably controllable through a bracket provided adjacent the front mounting bushing of the draw links, for example a strap rigidly connected with this bushing, a bolt fixed to the latter, or the like.

In order that the air springs may be easily exchanged these may furthermore be constructed with end plates which are constructed with rail sections and which may be easily pushed into position between the chassis and U-girder, the rail sections engaging correspondingly profiled pieces in said parts, and which the pushed-in position may be locked by a locking screw or the like.

The spring travel stroke or length of stroke of the assembly is restricted by arranging between the chassis and the U-girder, preferably its web portion, a bolt which may be fixed in the chassis and pass freely through the web portion.

To fix the position of the wheel axle in an axial direction there is also between the chassis and the web provided a bracing link mounted in the chassis and the web or axle.

The invention will now be described in more detail with reference to the accompanying drawings, in which FIG. 1 shows, by way of example, an embodiment of an air spring axle assembly according to the invention as seen in perspective obliquely from the front, FIG. 2 the same embodiment as seen from the side and FIG. 3 the axle assembly shown in FIGS. 1 and 2 as seen from behind.

Figure 2:
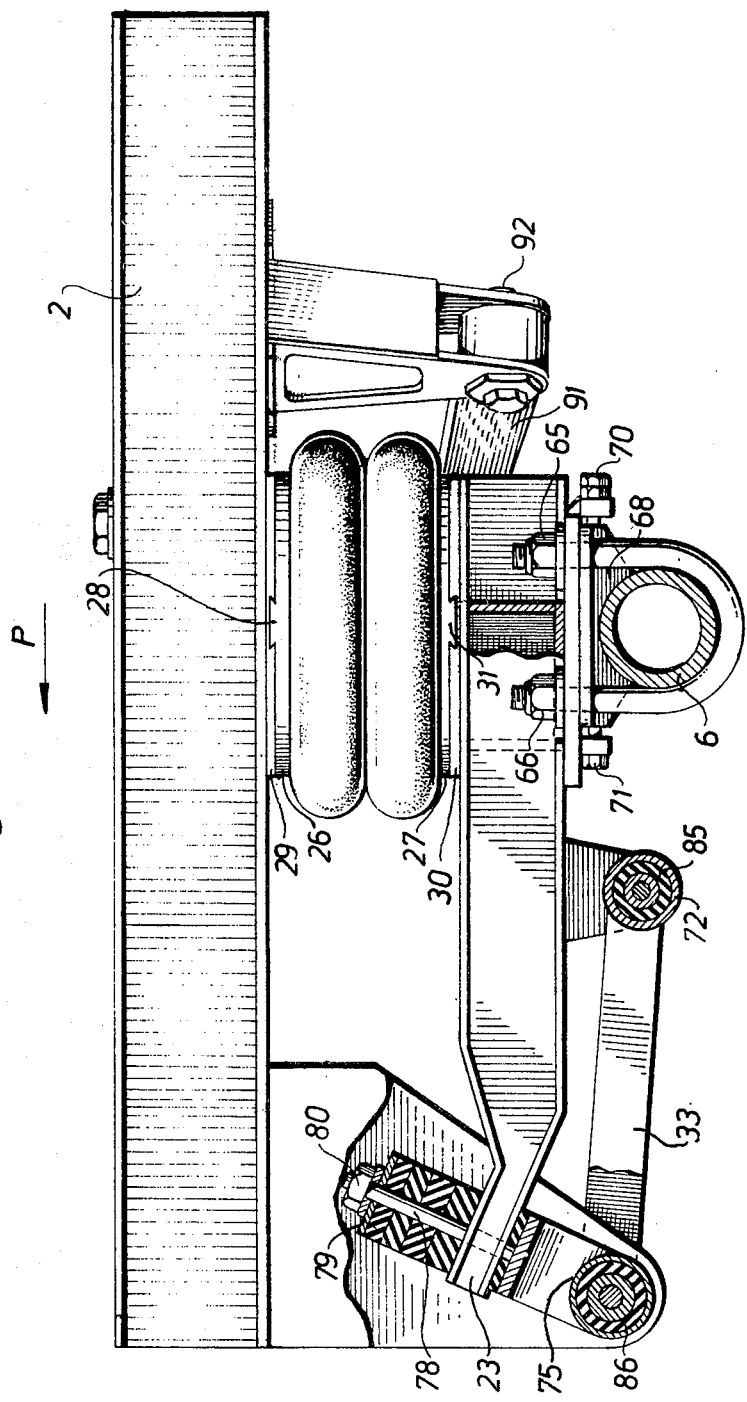
Figure 3:
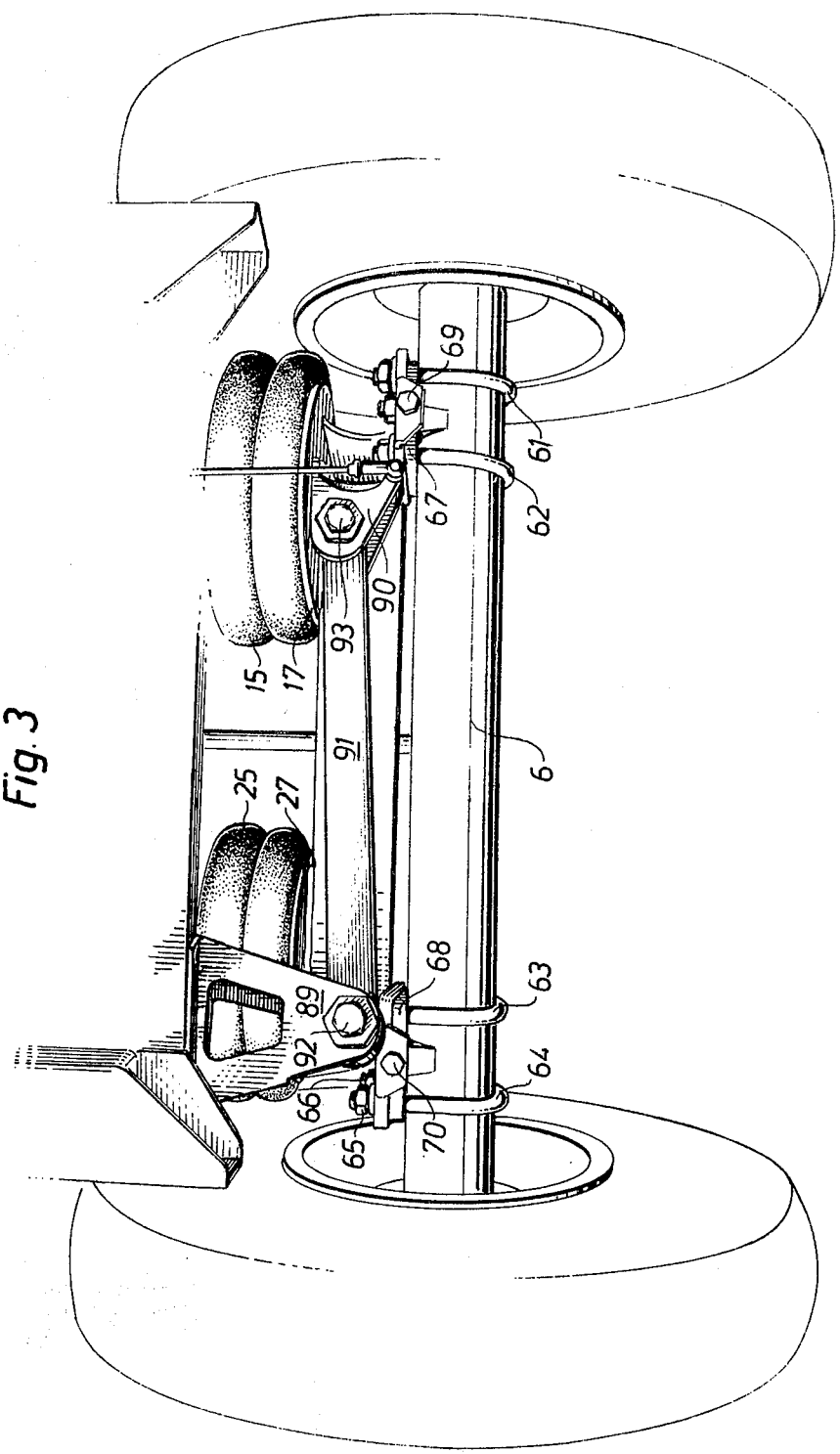

As will be seen from FIGS. 1 and 2, the direction of travel forward of the vehicle has been designated in these figures by arrows P. In the three figures structure elements corresponding to each other have been designated by the same numerals.

In the figures the two longitudinal beams of a vehicle chassis, which may be either a motor-driven vehicle or a vehicle drawn by a motor-driven one, have been designated by 1 and 2, respectively. The draw-shackles 11 and 21, respectively, by means of which the air spring axle assembly is intended to be drawn, are fixed to the beams 1 and 2, respectively, of the chassis, for example by welding. The central unit of the air spring axle assembly according to the invention consists of a U-shaped torsion-proof girder 12, 3, 22, which in the embodiment shown is composed of a web portion 3 constructed as a box girder, to which are welded the two legs 12, 22 constructed as I-girders. In order to strengthen the U-girder further corner pieces 4, 5 are welded at the corners between the box girder 3 and the legs 12 and 22.

The leg ends 13 and 23 of the U-girder are bent upwards and inserted between the lateral pieces of the respective shackles 11 and 21 so that they are guided laterally thereby to some extent. The opposite ends 14 and 24, respectively, of the two legs are carried slightly beyond the web portion 3. Between the web portion 3 and the leg ends 14 and 24, respectively, and the corresponding beams 1 and 2, respectively, of the chassis there are inserted air springs 15 and 25, respectively, which are provided with end plates 16 and 26, respectively, and 17 and 27, respectively. The end plates are provided with dovetail-section rails 18 and 28, respectively, and corresponding rails on the bottom end plates. End plates corresponding to the end plates 16, 17 and 26, 27 of the spring elements are provided which are mounted on the longitudinal beams 1 and 2 of the chassis and on the legs 12 and 22 of the U-girder, respectively. Out of these corresponding end plates only the end plates 29 and 30 in FIG. 2 are shown in the drawings.

In this way the air spring suspension elements 15, 25 may be moved in between the legs 12 and 22 of the U-girder and the longitudinal beams 1 and 2 of the chassis by means of jacks under the chassis beams 1 and 2, the rails 18 and 28, respectively, being moved into corresponding grooves in the end plates mounted on the beams and the rails of the bottom end plates 17 and 27, being moved into the grooves of the end plates mounted on the legs 12 and 22 of the U-girder, one of said grooves being shown in section in FIG. 2 under the designation 31.

The air spring suspension elements may be fixed in their positions by means of screws mounted in the U-girders 1 and 2 and the legs 12 and 22, respectively, of which screws one, namely screw 32, is shown in FIG. 1.

The wheel axle 6 with the wheels 7 and 8 is screwed on to the legs 12 and 22, respectively, of the U-girder by means of U-shaped wire straps 61, 62 and 63, 64. The ends of the wire straps are threaded and screwed on to the flanges of the legs by means of nuts, of which nuts 65 and 66 are shown in all three figures. Between the leg flanges and the axle 6 there are placed blocks 67, 68 of steel.

The axle 6 is locked in place also by means of side bolts 69, 70, 71 which pass through flaps welded to the legs and are applied to the respective steel blocks 67, 68.

For taking the axle assembly along in the direction of movement P of the vehicle there are provided draw links 19 and 33, respectively, which are mounted by means of bushings, one of which, namely bushing 72, is shown in FIG. 2, in shackles 20 and 73, respectively, provided on the legs 12 and 22, respectively. The draw links 19 and 33 are mounted in the chassis shackles 11 and 21, respectively, by means of bushings 74 and 75, respectively, provided in their opposite front ends. On said bushings there are provided stirrups 76 and 77, respectively, to which are welded bolts, one of which is shown in FIGS. 1 and 2, namely bolt 78. These bolts are passed freely through holes in the ends 13 and 23, respectively, of the legs 12 and 22, respectively, and on either side of the slightly bent and flattened ends 13, 23 there are provided resilient elements of rubber or similar material. Thereby, on the upper side of the ends 13, 23 there is formed a pile of such resilient elements which are covered with a washer 79 which is tightened against the said elements by means of a nut 80. In this way a clamping of the leg ends is obtained which may be controlled by the amount of tightening of the nut 80.

The bushing 72 in the shackle 73, as well as the bushing in the shackle 20 on the leg 12 and the bushings 74 and 75 have bolts 81, 82, 83, 84 passing through them which are secured in a suitable way by means of nuts. Each of said bushing is, as will be seen from FIG. 2, provided with a rubber bushing, for example 85 and 86, respectively.

In this way, as far as the drawing of the air spring axle assembly in the direction of the arrow P is concerned, there is obtained a quite elastic transfer of force, while the connection between the U-shaped girder and the wheel axle is quite unresilient.

The sway restraint obtained is entirely conditioned by the torsional stiffness of the U-girder 12, 3, 22 partly constructed as a box girder and is transferred via the bolt connection 78, 80 of the chassis shackle 21 and the corresponding bolt connection of the chassis shackle 11 to the chassis. As this transfer of the sway restraining forces takes place via the elastic elements tightened in a desired manner by the bolts of the chassis shackles, a sway restraint is obtained which may be precisely adjusted.

To limit the length of the stroke that the axle 6 may perform about the bolts 81, 82, 83, 84 and a bolt 85' is welded to a tag 87 welded to a transverse beam 86' of the chassis and passed freely through another tag 88 which is welded to the web 3. By a stationary unit mounted at the lower end of the bolt 85 the swinging of the axle assembly in a vertical direction can thus be limited.

As will be seen from the figures, it has been attempted to bend the ends 13, 23 of the legs 12 and 22 in such a direction that the extension of the bend backwards passes approximately through the axes 81, 82 of swinging and the central axis of the wheel axle 6. In this way a very flexible track steering of the wheels 7, 8 of the vehicle is obtained, at the same time as through the torsion-proof girder with the leg ends 13, 23 clamped elastically in the chassis shackles 11 and 21 an absolutely controlled sway restraint of the chassis is obtained.

To prevent the movement of the wheel axle 6 in an axial direction, there is, in a manner known per se, between a shackle 89 on the chassis and a shackle 90 on the U-shaped girder 3, or on the leg end 24, provided an articulated bracing link 91 which is mounted in the two abovementioned shackles through bolts 92 and 93, respectively.

While the invention has been described in relation to an embodiment thereof, yet it may be varied in any desired manner within the scope of the following claims.

What is claimed is:

1. A sway-restraining air spring axle assembly for a vehicle chassis comprising in combination: a U-shaped girder member including a pair of laterally spaced parallel legs and a web portion connected therebetween adjacent the rear end of said legs; an air suspension spring supported on each of said legs adjacent said web; means for connecting said air suspension spring to said girder member and to said chassis; a pair of first laterally spaced shackles connected to and depending from the chassis and adapted to respectively receive therein the front end portions of said girder legs; a pair of second laterally spaced shackles connected to and depending from the respective legs of said girder member intermediate said web and front end portions of the legs; a pair of laterally spaced draw links mounted pivotally respectively in said first and second shackles; means for resiliently securing the front end portions of said girder legs to said draw links within said first shackles and for adjustably controlling such resiliency; a rigid wheel axle assembly connected rigidly to said girder member.

2. An axle assembly according to claim 1, wherein said pair of girder-connected shackles each comprise a web and a pair of depending laterally spaced legs, said draw links being mounted respectively in said chassis-connected and girder-connected shackles so as to extend substantially parallel to and below the overlying girder leg.

3. An axle assembly according to claim 1, wherein the front end portion of each of said girder legs is inclined upwardly and is positioned within the associated chassis-connected shackle, said upwardly inclined girder leg portions being disposed along a line which coincides with a projected line extending through the axis of the axle and the pivotal axis of the draw link in the girder-connected shackle.

4. An axle assembly according to claim 1, wherein said means for resiliently securing said girder legs and draw links each include clamping means comprising an upwardly extending stirrup connected to said draw link, at least one resilient element positioned between the upper portion of said stirrup and said girder leg and above said girder leg, and fastening means for adjustably tightening the thus formed resilient connection between said girder leg and said draw link.

5. An axle assembly according to claim 1, wherein each of said girder legs is a channel member and said web portion of the girder is a box girder.

6. An axle assembly according to claim 1, wherein said means for connecting said air suspension spring to said girder and chassis include end plates on said air suspension spring, girder and chassis adapted to coact to slidably and detachably connect said air suspension spring to said girder and chassis.

* * * * *